US012108867B2

(12) United States Patent
Kazaka et al.

(10) Patent No.: US 12,108,867 B2
(45) Date of Patent: Oct. 8, 2024

(54) TOOL LANYARD DEVICE AND METHOD OF USE THEREOF

(71) Applicants: Sanita Kazaka, Huddersfield (GB); Normunds Kazaks, Huddersfield (GB)

(72) Inventors: Sanita Kazaka, Huddersfield (GB); Normunds Kazaks, Huddersfield (GB)

( * ) Notice: Subject to any disclaimer, the term of this patent is extended or adjusted under 35 U.S.C. 154(b) by 0 days.

(21) Appl. No.: 18/144,778

(22) Filed: May 8, 2023

(65) Prior Publication Data

US 2023/0270240 A1 Aug. 31, 2023

Related U.S. Application Data

(63) Continuation of application No. 17/058,594, filed as application No. PCT/GB2019/051454 on May 28, 2019, now abandoned.

(30) Foreign Application Priority Data

May 25, 2018 (GB) ..................................... 1808648

(51) Int. Cl.
*B25H 3/00* (2006.01)
*A45F 5/00* (2006.01)
*A45F 5/02* (2006.01)

(52) U.S. Cl.
CPC .............. *A45F 5/004* (2013.01); *A45F 5/021* (2013.01); *A45F 5/022* (2013.01); *B25H 3/006* (2013.01); *A45F 2005/006* (2013.01); *A45F 2200/0575* (2013.01)

(58) Field of Classification Search
CPC .............. A45F 5/004; A45F 2200/0575; A45F 2005/006; B65H 75/4405
USPC ................................. 224/162; 242/380, 402
See application file for complete search history.

(56) References Cited

U.S. PATENT DOCUMENTS

| | | | | |
|---|---|---|---|---|
| 3,524,336 A * | 8/1970 | Crosby | A45C 11/32 | 70/457 |
| 6,372,988 B1 * | 4/2002 | Burke | B65H 75/4449 | 242/360 |
| 2010/0206922 A1 * | 8/2010 | Gross | A45F 5/004 | 224/162 |
| 2012/0205478 A1 * | 8/2012 | Balquist | A62B 35/04 | 242/380 |
| 2017/0174468 A1 * | 6/2017 | Tamagi | B65H 75/48 | |

* cited by examiner

*Primary Examiner* — Adam J Waggenspack
(74) *Attorney, Agent, or Firm* — Head, Johnson, Kachigian & Wilkinson, PC

(57) ABSTRACT

A lanyard device suitable for connecting a tool to a user in use, including a housing at least part of which is adapted to be connected to clothing, belt and/or safety harness. The housing including at least one socket means formed thereon and/or therein, said device also including a flexible lanyard or tether means, at least one end of which is adapted to connect to a tool in use. At least part of the said lanyard means includes a portion to be received and/or engage with said socket means and said socket means shaped and/or orientated such that the flexible lanyard cannot pass freely through said socket means when the user lets go of the tool and/or lanyard.

12 Claims, 11 Drawing Sheets

TOOL LANYARD DEVICE AND METHOD OF USE THEREOF

CROSS-REFERENCE TO RELATED APPLICATIONS

This application is a continuation application of U.S. patent application Ser. No. 17/058,594 filed Nov. 24, 2020 which is the national phase of International PCT Application No. PCT/GB2019/051454 filed May 28, 2019.

BACKGROUND OF THE INVENTION

1. Field of the Invention

The present invention relates to lanyards and in particular lanyards suitable for use with tools which are secured to a user's clothing, belt and/or safety harness via said lanyard.

Although the following description refers to retractable lanyard devices for use with handtools, the person skilled in the art will appreciate that the present invention could be used to secure other articles and is not limited to tools. Further the present invention could be used in conjunction with non-retractable lanyards and lanyard devices.

2. Prior Art

Retractable lanyard devices are known. Conventional retractable lanyard devices are typically attached via a housing to the user's clothing, belt and/or safety harness. A retraction mechanism is usually located inside the housing which is attached to the first end of the lanyard. The second or distal end of the lanyard is connected to a hand tool and it is the lanyard mechanism that holds the tool in position when not in use. The device also serves to stop the tool falling if dropped. These types of lanyard devices are often used when working at height to keep the tool to hand as well as preventing the tool from falling a significant distance if dropped.

A problem with conventional retractable lanyards is that the retracting mechanism has to be very strong if it is to be able to retract a relatively heavy tool, for example a hammer or power drill, when not in use. As such, the user has to overcome significant force to extend the lanyard and use the tool. In addition retractable lanyards that can be used with heavy tools are themselves heavy.

US2002174521 discloses a retractable lanyard device which is used in combination with a holster to keep the tool close to the user for convenience when not in use. This enables a less powerful retraction mechanism to be used but complicates the system.

It is therefore an aim of the present invention to provide a lanyard device which addresses the abovementioned problems.

It is a further aim of the present invention to provide a method of using a lanyard device which addresses the abovementioned problems.

SUMMARY OF THE INVENTION

In a first aspect of the invention there is provided a lanyard device suitable for connecting a tool to a user in use, said device including a housing at least part of which is adapted to be connected to clothing, belt and/or safety harness in use, said housing including at least one socket means formed thereon and/or therein, said device also including a flexible lanyard or tether means, at least one end of which is adapted to connect to a tool in use and wherein at least part of the said lanyard means includes a portion adapted to be received and/or engage with said socket means and said socket means shaped and/or orientated such that the flexible lanyard cannot pass freely through said socket means when the user lets go of the tool and/or lanyard.

Preferably the lanyard includes at least one non-flexible or substantially rigid portion adapted to be received in at least part of the socket means.

In a preferred embodiment the device includes a retraction mechanism. Typically the retraction mechanism is located inside the housing.

In one embodiment the retraction mechanism includes a spring. Typically the spring is a coiled spring.

In a preferred embodiment the socket means is formed in the top or towards the top of the housing. Typically the socket is shaped and/or configured to receive at least part of the non-flexible part of lanyard or tether means therein. As such, the tool to which the lanyard is connected is prevented from falling and/or retained close to or in proximity of the housing when the non-flexible portion and the socket means are engaged or otherwise attached.

In one embodiment the user can engage the substantially rigid portion in the socket means and let the tool hang or dangle when not required or not in use. The skilled person will appreciate that this is a significant additional improvement to conventional lanyards which only prevent tools falling a significant distance.

Typically the lanyard means is retracted. Further typically the socket means and the rigid portion are coupled together to bear the weight of the tool attached to the lanyard. As such, when not in use the tool can be 'holstered' by engaging or connecting the socket means and rigid portion.

Additionally, the lanyard means prevents the tool from falling if dropped and the engagement keeps the tool in a convenient location between uses.

Further, if a lanyard means retraction mechanism is used the same can be relatively weak as the mechanism does not have to overcome the weight of the tool to keep the same in a retracted position.

Typically the socket means and non-flexible or rigid portion are disengaged by pulling the lanyard means and/or tool in a substantially upwards direction.

In one embodiment the socket and/or rigid portion are formed from plastics material.

In one embodiment the socket and/or rigid portion are formed from substantially metal or metallic material. Typically the metallic material is aluminium.

In one embodiment at least part of the socket is formed from a material that is harder than the material forming the housing. Typically the housing is formed from substantially plastics material. Further typically at least part of the socket means and/or rigid portion is formed from metal.

In one embodiment at least part of the housing is substantially formed from carbon fibre material.

In one embodiment the device housing includes at least one aperture and/or clip means by which the device can be attached to the user's clothing, belt, pocket and/or harness.

In one embodiment the housing includes an extension portion. Typically the extension portion is a part of the housing that extends or protrudes in a substantially linear direction from the main housing body. Further typically the extension portion is a plate or protrusion that prevents the housing from turning or spinning when the socket means and rigid portion are disengaged or pulled apart.

In one embodiment the housing body is substantially cylindrical.

In one embodiment the housing body is hexagonal.

In one embodiment the non-flexible or rigid portion has a diameter greater than the lanyard diameter or thickness. Typically the substantially rigid portion is thicker than the lanyard means.

In one embodiment the non-flexible or rigid portion is substantially spherical in at least one direction. In one embodiment the rigid portion is a ball.

In one embodiment the rigid portion is substantially a linear member. Typically the rigid portion is a substantially cylindrical pin or bar.

In one embodiment the distal or free end of the flexible lanyard includes attachment means. Typically the attachment means are configured to attach a tool to end of the flexible lanyard means and/or rigid portion.

In one embodiment the rigid portion and/or socket means are retrofitted to an existing retractable lanyard device. Typically the non-flexible or rigid portion is fitted over or on a flexible lanyard means. Further typically the rigid portion is clamped onto a lanyard means.

Typically the engagement or connection between the socket means and rigid portion is substantially a male to female arrangement. Further typically the socket is the female engagement or connecting member and the rigid portion is the male engagement or connecting member.

In one embodiment a socket means is fitted or retrofitted to the housing of a lanyard device. Typically the socket means is fitted to the aperture in the housing through which the flexible lanyard means protrudes.

In one embodiment of the invention there is provided an apparatus that incorporates two or more lanyard devices described herein.

Preferably the apparatus includes two lanyard devices.

In one embodiment the apparatus includes one or more one wall members to which the lanyard devices are attached or mounted in use. Typically the lanyard devices are detachable attached to at least one of the one or more wall members.

Further typically the lanyard devices are arranged or mounted parallel to each other in or on the apparatus.

As such, the user can selectively use a tool attached to a lanyard and keep the same handy as he switches to another tool attached to the apparatus via another lanyard device.

In one embodiment the wall members form one of more channels into which the lanyard devices can be inserted and/or engaged.

In a second aspect of the invention there is provided a method of using a lanyard device, said device including a housing at least part of which is adapted to be connected to clothing and/or a belt in use, said housing including at least one socket means formed therein, said device also including a flexible lanyard or tether means, at least one end of which is adapted to connect to a tool in use and wherein at least part of the said lanyard means includes at least one non-flexible or substantially rigid portion adapted to be received in at least part of the socket means wherein said method includes the step of engaging or coupling the non-flexible or substantially rigid portion in the socket means.

In a third aspect of the invention there is provided a method of manufacturing a lanyard device, said device suitable for connecting a tool to a user in use, said device including a housing at least part of which is adapted to be connected to clothing, belt and/or safety harness in use, said housing including at least one socket means formed thereon and/or therein, said device also including a flexible lanyard or tether means, at least one end of which is adapted to connect to a tool in use and wherein at least part of the said lanyard means includes a portion adapted to be received and/or engage with said socket means and said socket means shaped and/or orientated such that the flexible lanyard cannot pass freely through said socket means when the user lets go of the tool and/or lanyard, said method including the step of forming at least part of the housing from plastics and/or metal material.

BRIEF DESCRIPTION OF THE DRAWINGS

Specific embodiments of the invention are now described with reference to the following drawings.

DETAILED DESCRIPTION OF THE PREFERRED EMBODIMENTS

Figure 1:
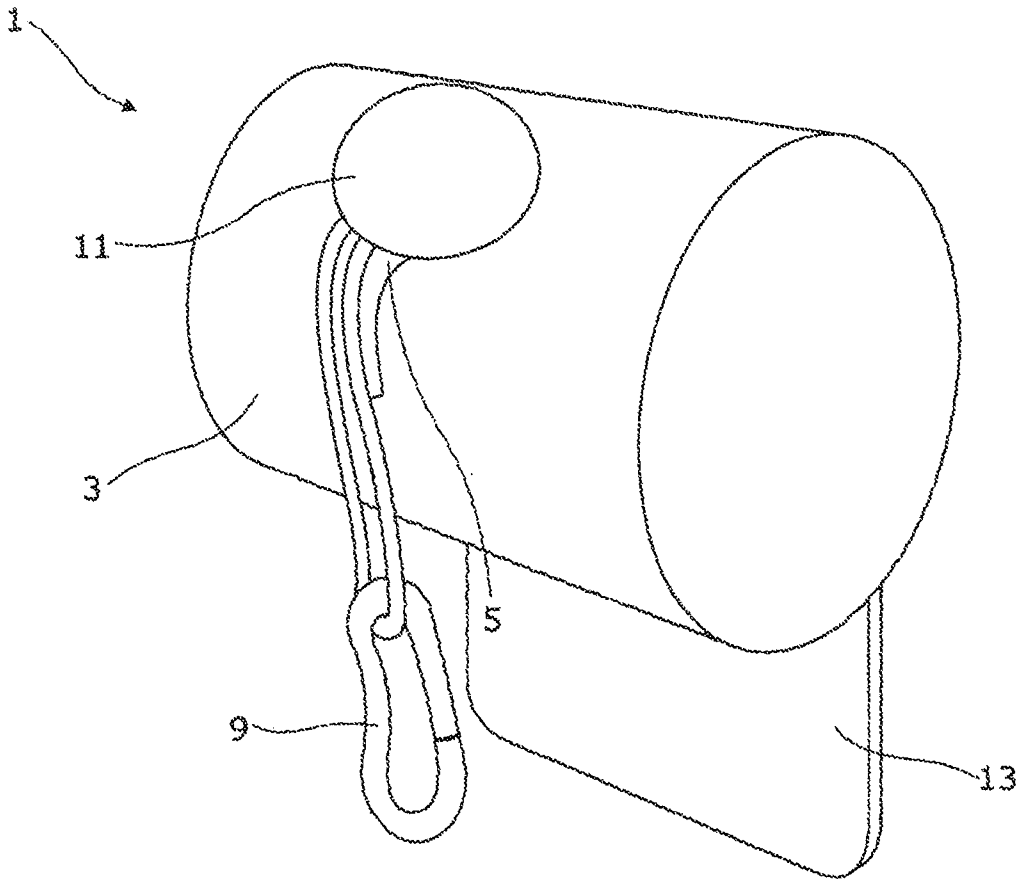
FIG. 1 illustrates a view of a lanyard device in an extended position, in accordance with an embodiment of the present invention.
Figure 2:
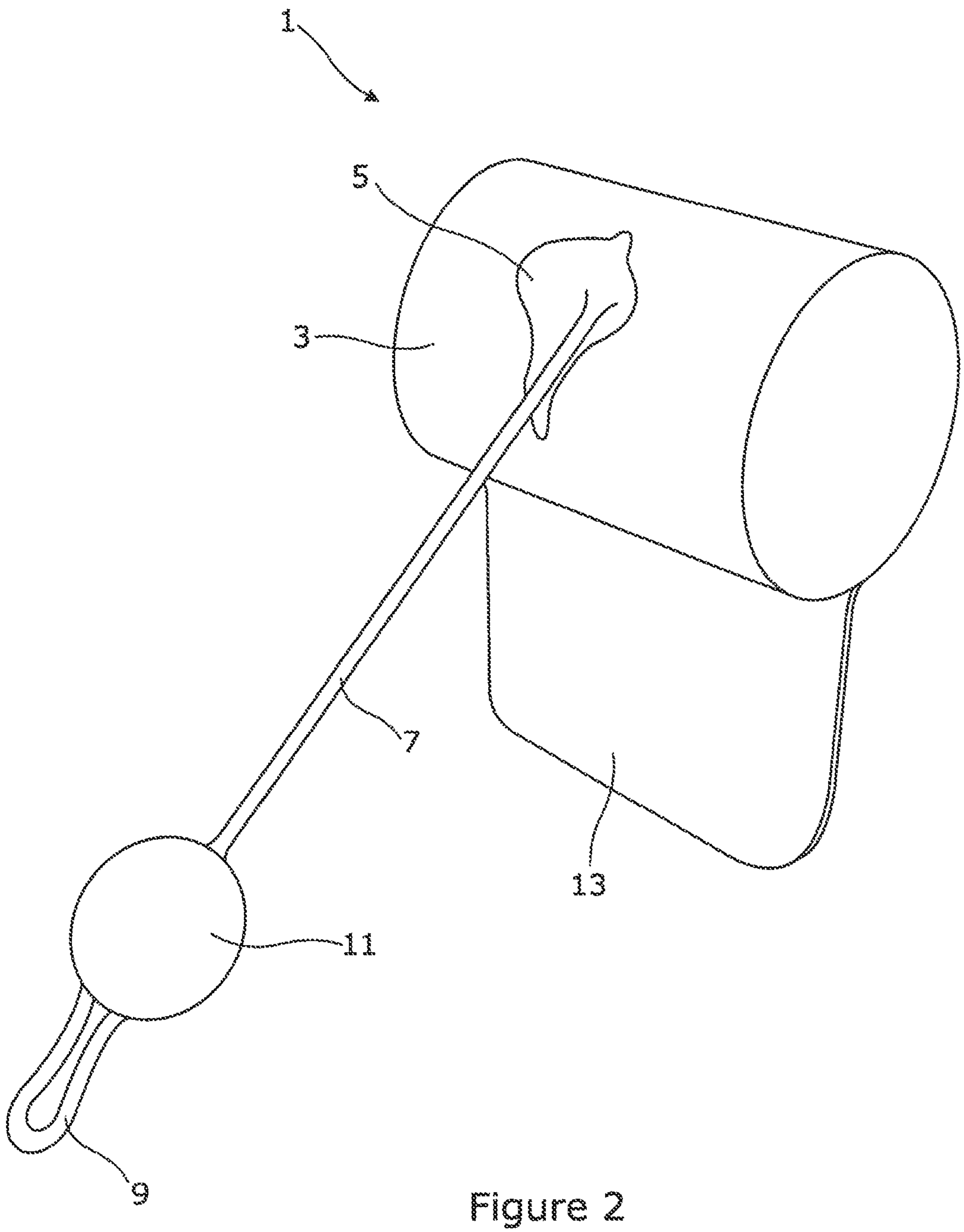
FIG. 2 illustrates a view of a lanyard device in a retracted position, in accordance with an embodiment of the present invention.

Referring now to the figures, the present invention provides a lanyard device 1 as shown in FIG. 1, which is provided for connecting a tool (not shown) thereto, in use. The lanyard device 1 includes a housing body 3, which is provided to be attachable to a user's clothing or belt etc. The attachment may be direct or via attachment means provided on the device 1. The housing 3 is provided with a substantially cylindrical body and includes a socket 5 formed therein, and generally located at an upper part of the housing 3. A flexible lanyard in the form of a tether 7 is provided with the device 1, and shown in an extended position in FIG. 2. The tether 7 provided is a flexible member which, at a proximal end, located within the housing 3, is connected to a retraction means (not shown). This may be provided in the form of a coiled spring member or the like, and permits extension of the tether 7, in use, to an extended position and, when not in use, retracts the tether 7 to a retracted position, shown best in FIG. 1. At a distal end of the tether 7, there is provided attachment means in the form of a hook or carabiner 9, which is used to attach to a worker's tool. Other attachment means may also be used in addition to or alternatively from the carabiner 9 that is shown. Further, at or adjacent the distal end of the tether 7, there is provided a non-flexible or substantially rigid portion, in this case illustrated in the form of a substantially solid ball 11. The ball 11 is formed to be located within at least part of the socket 5 of the housing 3.

Although a ball 11 and socket 5 configuration is illustrated, it will be appreciated that non-flexible members having differing shapes may be provided which perform the same function and locate at least partly within a socket 5 of the housing 3. Thus, when a tool is attached to the carabiner 9 and the ball 11 is located within the socket 5, under gravity and the weight of the tool, the ball 11 is retained securely within the socket 5, thereby preventing inadvertent removal of the same therefrom. As such, the tool to which the lanyard device 1 is connected is prevented from falling and is retained close to or in proximity of the housing 3 when the ball 11 and the socket 5 are engaged or otherwise attached. When not in use, the tool can now simply hang or dangle from the device 1 without a user worrying that it may fall or, if it is a heavy tool, inadvertently cause the tether 7 to extend. This is due to the housing 3, bearing the weight of the tool when the ball 11 and socket 5 are engaged, i.e., the tool can be "holstered" with the device 1. The lanyard device 1 therefore, prevents the tool from falling if dropped and the engagement keeps the tool in a convenient location between uses. Further, if a lanyard retraction mechanism is used the same can be relatively weak as the mechanism does not have to overcome the weight of the tool to keep the same in a retracted position. In order for a user to disengage the ball 11 and socket 5, the tool/ball 11/tether 7 must first be pulled in an upward direction, removing the ball 11 from the socket 5. Subsequently, the tether 7 may then be extended as required by a user.

The person skilled in the art will appreciate that the present invention uses the friction or contact between the lanyard and the socket to prevent the tool from falling. The skilled person will also appreciate that a socket could be configured to prevent the lanyard slipping and the non-flexible member is a distinct advantage over the prior art but not essential.

In some examples of the invention, the socket 5 may be formed from or may further include a material which is harder than the material forming the remainder of the housing 3. In general, the housing 3 is formed from a plastics material. The socket 5 may at least in part be formed from metal. In some embodiments, a metal portion may be provided in and/or around the socket 5 to reinforce the same.

The device may further include an extension portion, shown in the figures as a protruding plate member 13 extending from the housing 3. The plate 13 is provided to extend in a substantially linear direction from the housing 3 and is arranged to prevent the housing 3 from turning or spinning when the ball 11 and socket 5 are engaged or being separated by a user.

Figure 3:
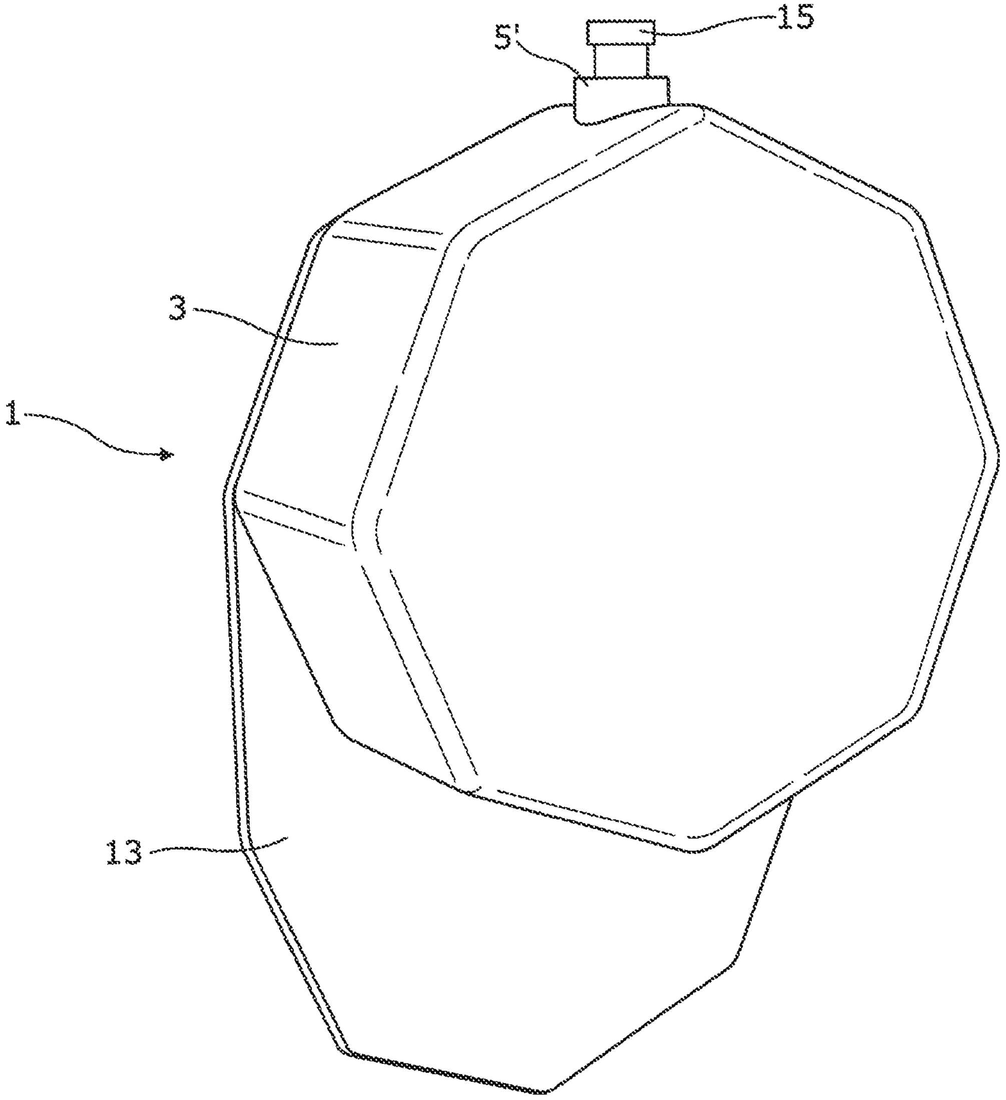
FIG. 3 illustrates a front view of a lanyard device in accordance with another embodiment of the present invention.
Figure 4:
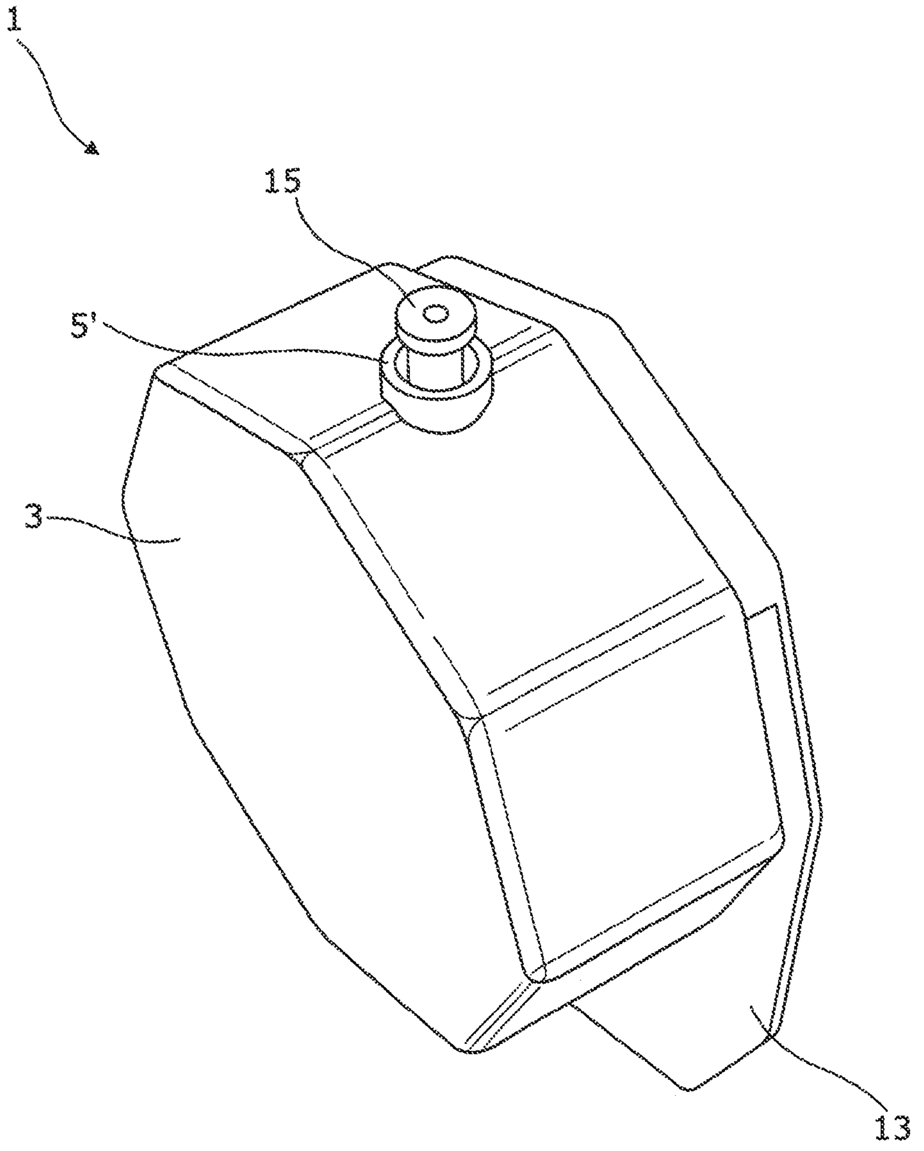
FIG. 4 illustrates a perspective view of a lanyard device in accordance with another embodiment of the present invention.
Figure 5:
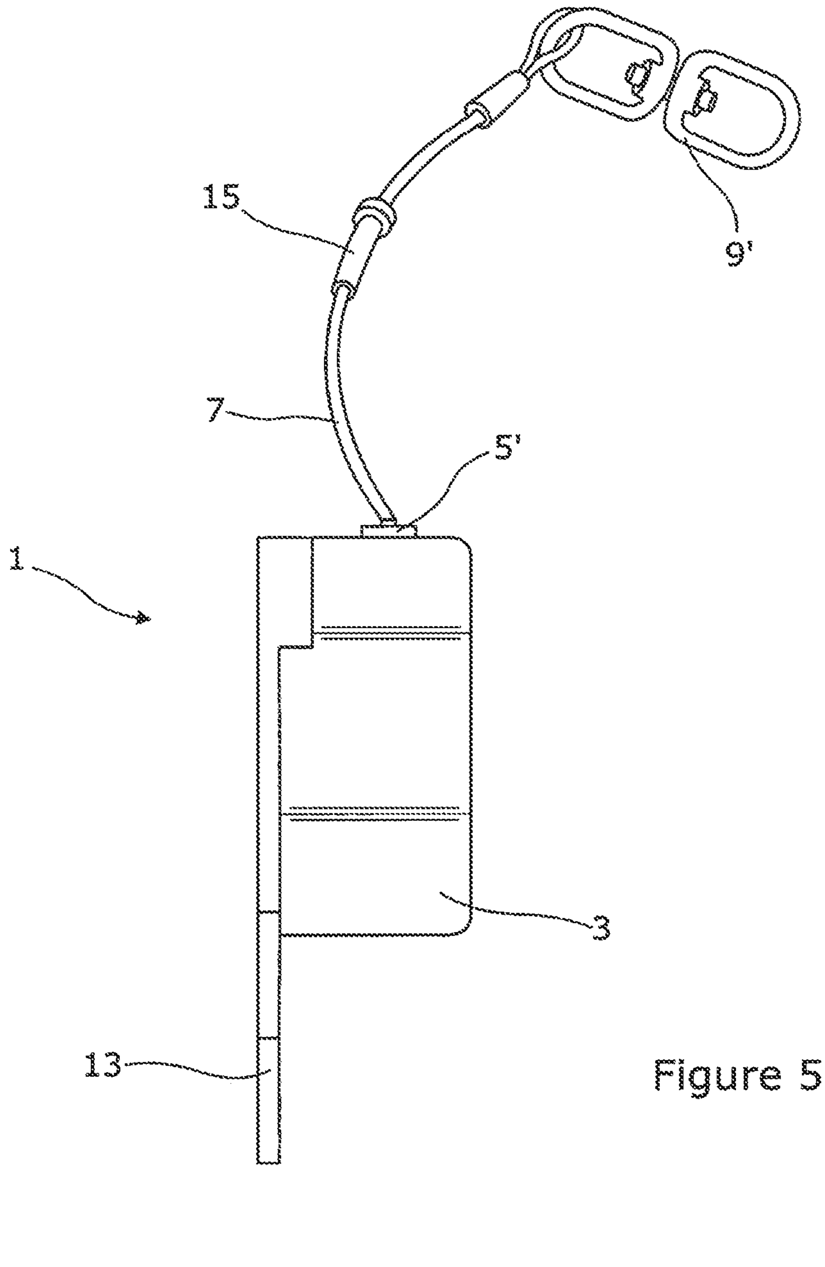
FIG. 5 illustrates a side view of a lanyard device in a partially extended position, in accordance with another embodiment of the present invention.
Figure 6:
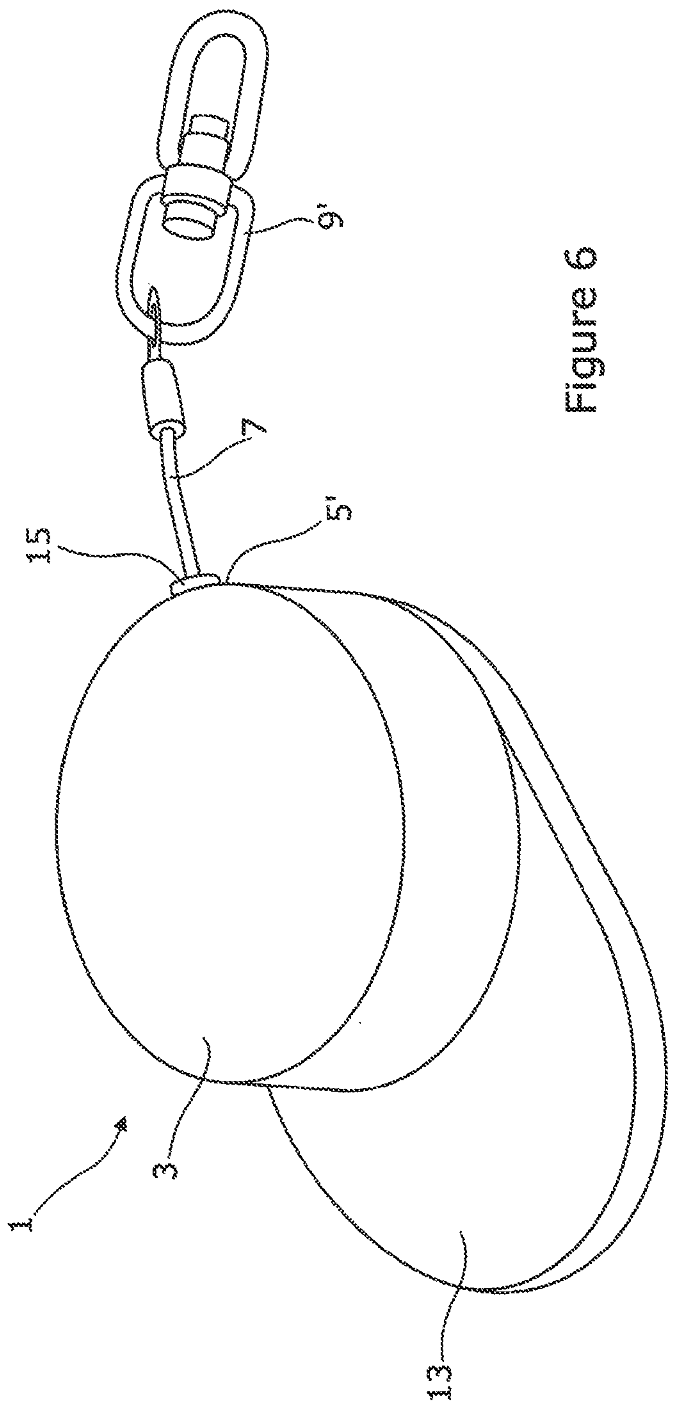
FIG. 6 illustrates a perspective view of a lanyard device in a retracted position, in accordance with another embodiment of the present invention.
Figure 7A:
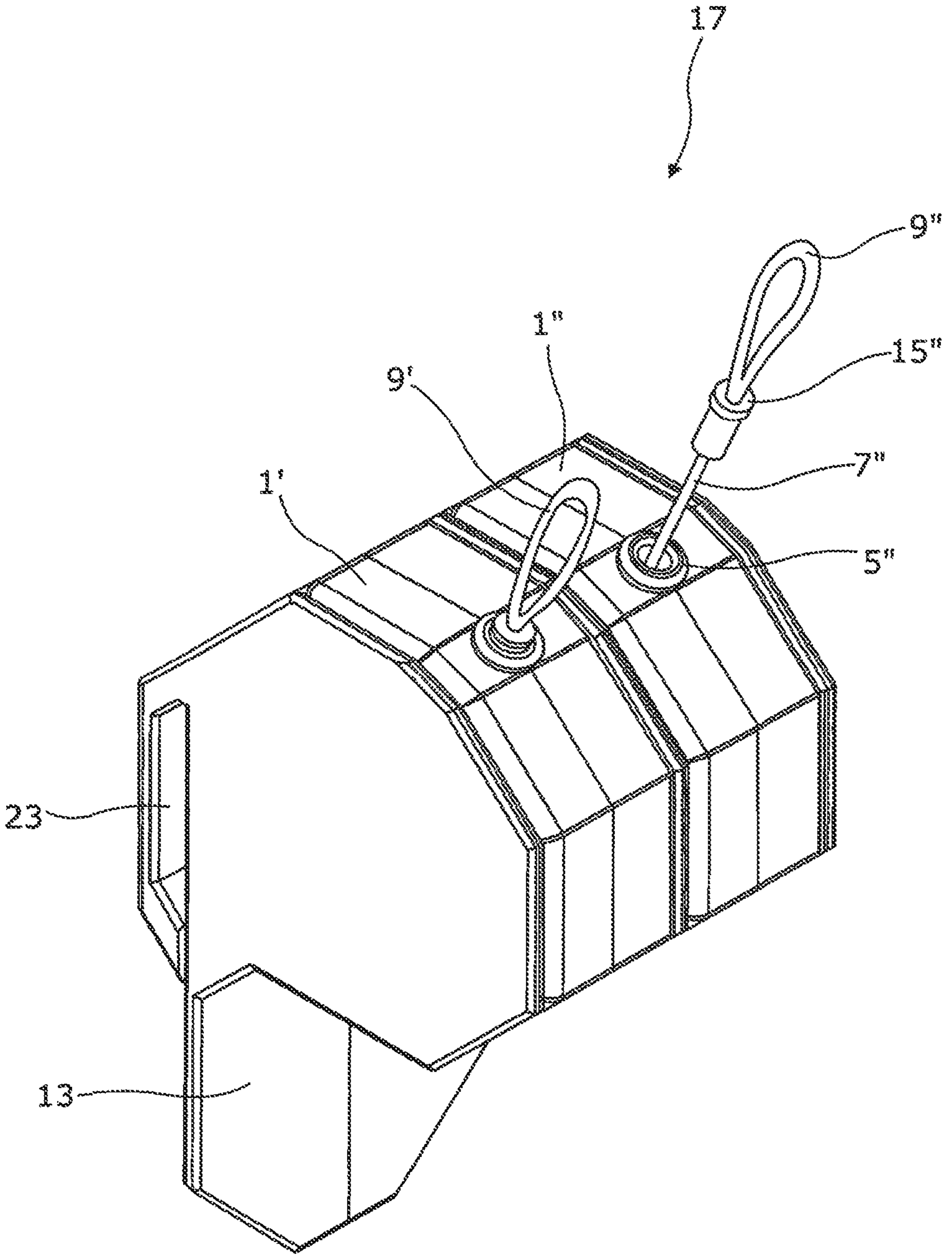
FIGS. 7*a*-7*c* illustrate perspective views of a dual device in accordance with one embodiment of the invention.
Figure 7B:
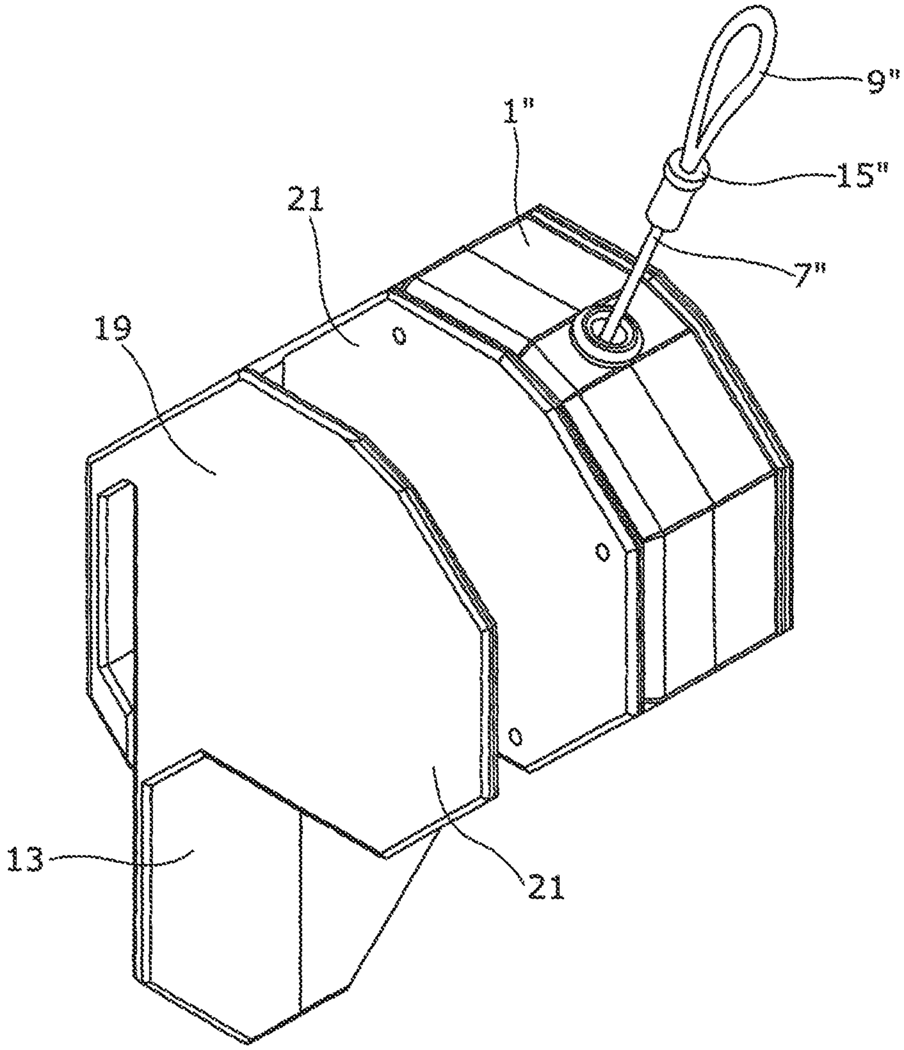
Figure 7C:
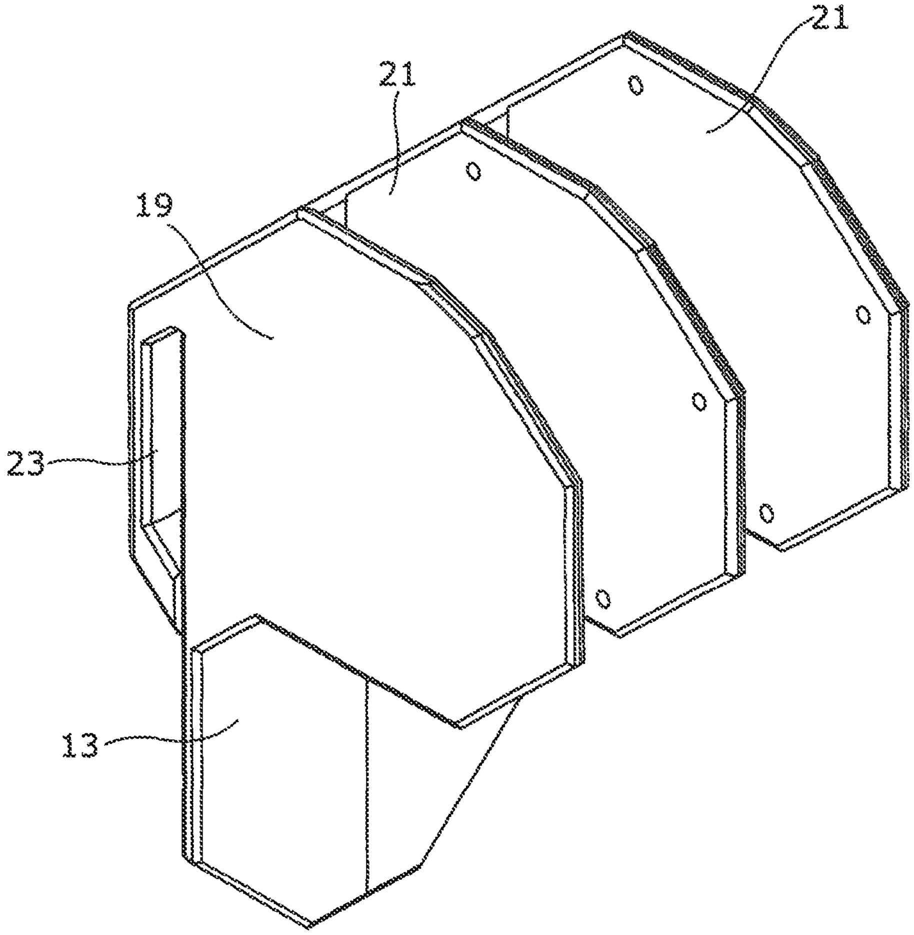

In some examples of the present invention, a ball 11 and socket 5 arrangement is not necessarily required. FIGS. 3 and 4 illustrate the housing 3 having a hexagonal body within which the retraction mechanism may be located. It will be appreciated that other shapes may also be provided, for example, a substantially circular body may be provided, as shown in FIGS. 5 and 6. At or adjacent the distal end of the tether 7, the non-flexible or rigid portion may be provided as a linear member, typically in the form of a pin or bar portion 15. The pin or bar 15 has a diameter or thickness which is greater than that of the tether 7. When in the retracted position, the pin or bar 15 may rest at least partially within an aperture 5' which is provided in an upper portion of the housing 3. Located distally of the pin or bar 15, the attachment means 9' are provided for attachment of a tool thereto. When the pin or bar 15 is resting within the aperture/socket 5', the rigid nature is such that even under the weight of a tool hanging from the attachment means 9', the pin or bar 15 remains securely within the aperture/socket 5', thereby preventing the tether 7 from extending inadvertently.

In some examples of the invention, the ball 11, pin or bar 15 may be retrofitted to existing tethers on lanyard devices. These may be fitted over or around part of the existing tether, and/or clamped thereto. In some examples, the socket 5 or aperture may also be retrofitted to a lanyard device. In particular, a specific socket 5 or aperture 5' may be fitted to an existing aperture of such a device in order to permit suitable receipt of a rigid or non-flexible portion thereto.

Turning to FIG. **7*a* where there is shown an embodiment of the invention where two devices 1',1" are combined in a single unit 17. Each of the devices 1',1" can be operated separately and each has its own attachment means 9', 9" so two tools can be attached and held by the user when not in use. The features of the devices are essentially the same as a single unit comprising a pin or bar 15',15", as well as a socket 5',5"** to receive the same.

As shown in FIGS. **7*b* and 7*c*, the devices 1',1" can be selectively removed from a holder 19. The holder 19 includes a number of wall members 21 to which the devices can be detachably attached. The holder also includes a plate 13 to prevent rotation of the unit 17 and devices. In addition, the holder 19 includes an aperture 23 which is located at the rear of the same to receive a belt or other similar item to the unit 17** can be attached to the user's waist.

Figure 8:
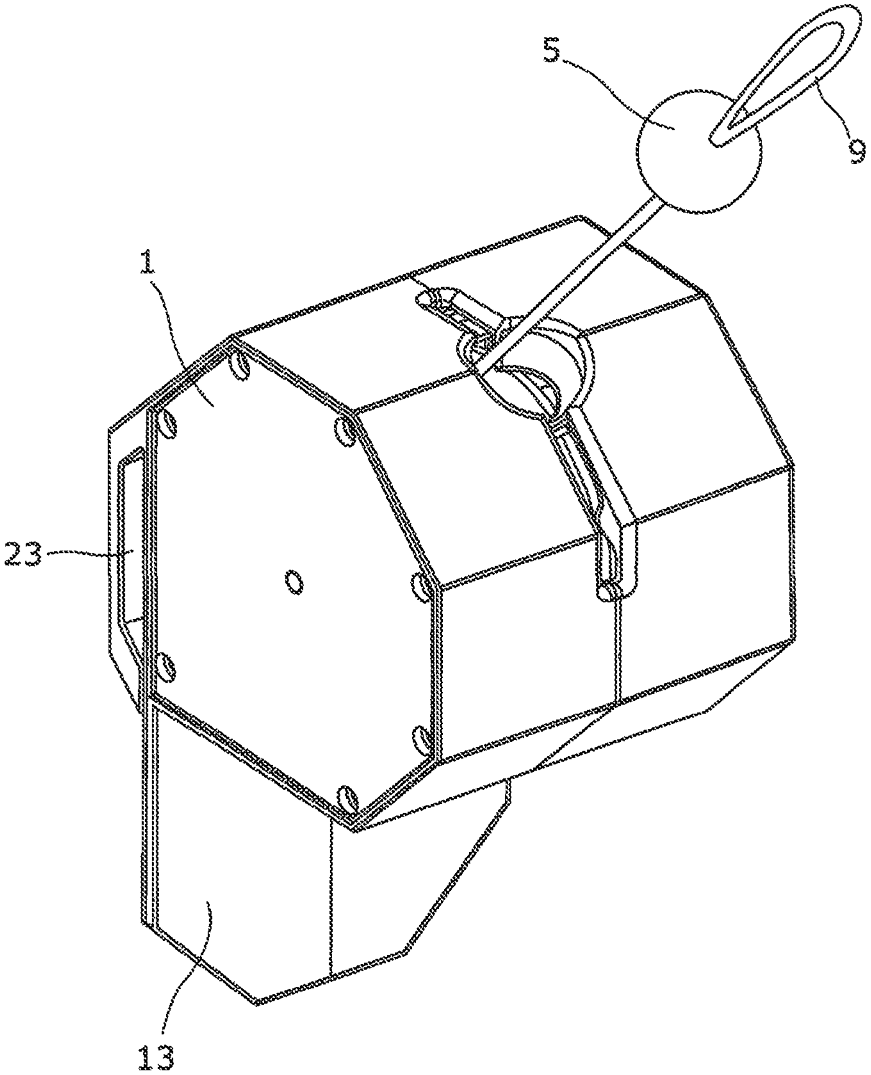
FIG. 8 illustrates a side perspective view of a lanyard device in a partially extended position, in accordance with another embodiment of the present invention.
Figure 9:
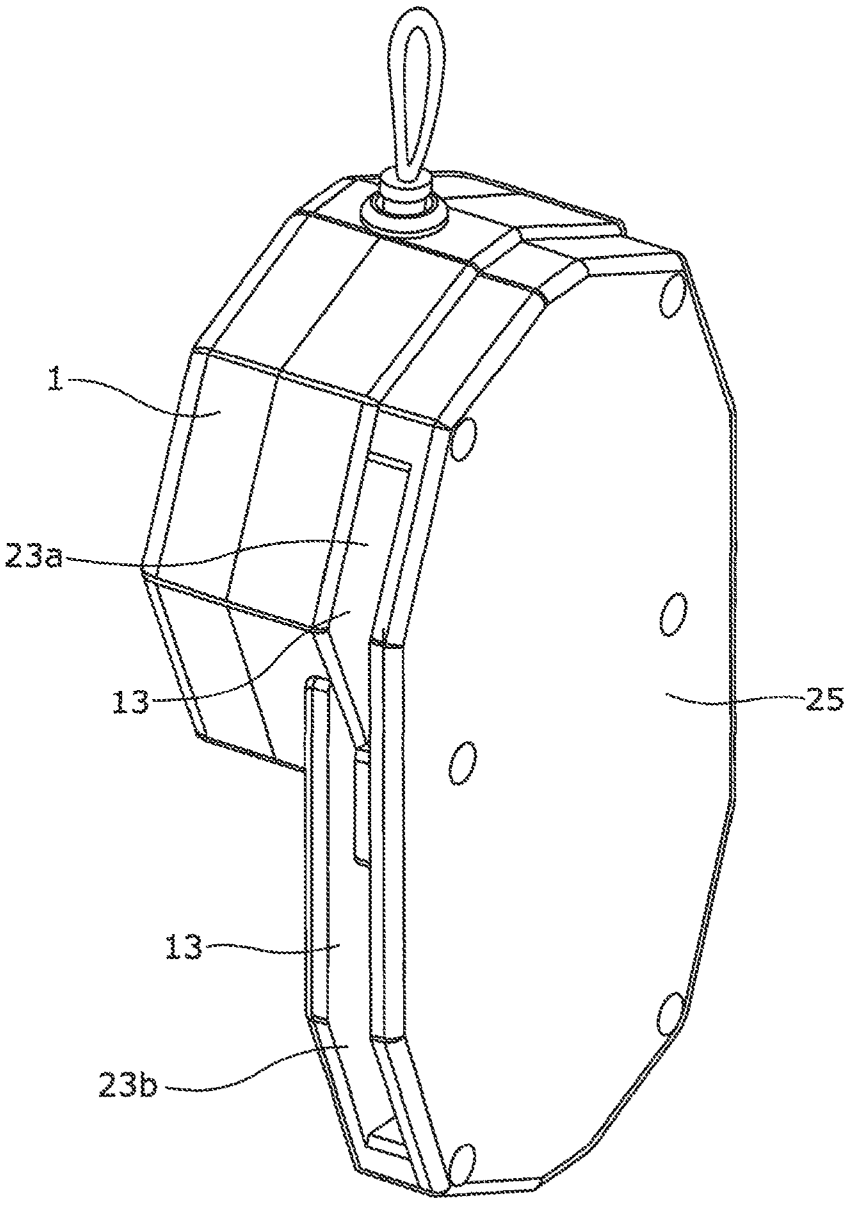
FIG. 9 illustrates a side perspective view of a lanyard device in a retracted position, in accordance with another embodiment of the present invention.

FIGS. 8 and 9 show additional embodiments of the invention where the aperture is formed on the back of a single device 1. In the example given in FIG. 9, two apertures **23*a*, 23*b* are formed from the attachment of an additional plate 25 to the rear of the device. The plate 25** can be selectively removed if the user does not require belt apertures.

What is claimed is:

1. A lanyard device to connect a hand tool to a user, said device comprising:

a housing at least part of which is adapted to be connected to clothing, belt and/or safety harness, said housing including at least one socket means formed thereon and/or therein in the top or towards the top of the housing, said device including a retractable flexible lanyard or tether means, at least one end of which is adapted to connect to a hand tool and wherein at least part of the said lanyard means includes a non-flexible, rigid ball, pin or bar to be received and/or engage with said socket means and said socket means shaped and/or configured to receive at least part of the non-flexible, rigid ball, pin or bar part of the lanyard means therein and further shaped and/or orientated such that the flexible part of the lanyard means cannot pass freely through said socket means when the user lets go of the hand tool characterised in that the weight of the hand tool is borne by coupling socket means and the non-flexible, rigid ball, pin or bar portion together thereby preventing the flexible lanyard or tether means from extending and letting the hand tool hang or dangle in a non-fixed orientation when not in use and the user lets go of the hand tool, and wherein the socket means and non-flexible, rigid ball, pin or bar are disengaged by pulling the lanyard means and/or tool in an upwards direction.

2. A lanyard device according to claim 1 wherein the device includes a retraction mechanism.

3. A lanyard device according to claim 1 wherein the socket and/or non-flexible, rigid portion are formed from plastics material or from metal or metallic material.

4. A lanyard device according to claim 1 wherein the socket and/or non-flexible, rigid portion are formed from plastics material or from metal or metallic material.

5. A lanyard device according to claim 1 wherein at least part of the socket is formed from a material that is harder than the material forming the housing.

6. A lanyard device according to claim 1 wherein the housing is formed from plastics material.

7. A lanyard device according to claim 1 wherein the device housing includes at least one aperture and/or clip means by which the device can be attached to the user's clothing, belt, pocket and/or harness.

8. A lanyard device according to claim 1 wherein the housing includes an extension portion that extends or protrudes in a linear direction from the main housing body.

9. A lanyard device according to claim 1 wherein the housing body is cylindrical or hexagonal.

10. A lanyard device according to claim 1 wherein the non-flexible, rigid portion has a diameter greater than the lanyard diameter or thickness.

11. A lanyard device according to claim 1 wherein the distal or free end of the flexible lanyard includes attachment means configured to attach a tool to the end of the flexible lanyard means and/or non-flexible, rigid portion.

12. A lanyard device according to claim 1 wherein the socket is a female engagement or connecting member and the non-flexible, rigid portion is a male engagement or connecting member.

* * * * *